(12) United States Patent
Poulsen

(10) Patent No.: US 9,235,294 B2
(45) Date of Patent: Jan. 12, 2016

(54) PHASE SENSITIVE LOW POWER DIGITAL ULTRASONIC MICROPHONE

(71) Applicant: BlackBerry Limited, Waterloo (CA)

(72) Inventor: Jens Kristian Poulsen, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 336 days.

(21) Appl. No.: 13/896,794

(22) Filed: May 17, 2013

(65) Prior Publication Data

US 2014/0340366 A1 Nov. 20, 2014

(51) Int. Cl.
*G01S 3/80* (2006.01)
*G06F 3/043* (2006.01)

(52) U.S. Cl.
CPC .............. *G06F 3/043* (2013.01); *G06F 3/0433* (2013.01)

(58) Field of Classification Search
CPC ...................................................... G06F 3/043
USPC ......................................................... 367/125
See application file for complete search history.

(56) References Cited

U.S. PATENT DOCUMENTS

| | | | |
|---|---|---|---|
| 5,561,641 A | 10/1996 | Nishimori et al. | |
| 6,363,139 B1 | 3/2002 | Zurek et al. | |
| 8,000,926 B2 | 8/2011 | Roche et al. | |
| 8,787,113 B2 * | 7/2014 | Turbahn et al. | 367/118 |
| 8,861,312 B2 * | 10/2014 | Altman et al. | 367/181 |
| 2002/0047833 A1 | 4/2002 | Kitada et al. | |
| 2003/0071798 A1 | 4/2003 | Baron et al. | |
| 2004/0160429 A1 | 8/2004 | Blake et al. | |
| 2004/0169439 A1 | 9/2004 | Toda | |
| 2004/0169644 A1 | 9/2004 | Xu et al. | |
| 2005/0101271 A1 * | 5/2005 | Ahn et al. | 455/137 |
| 2005/0140663 A1 | 6/2005 | Nakamura | |
| 2005/0171714 A1 | 8/2005 | Ely et al. | |
| 2006/0077188 A1 * | 4/2006 | Byun | 345/179 |
| 2008/0309645 A1 | 12/2008 | Wang | |
| 2009/0009490 A1 | 1/2009 | Yang | |
| 2009/0153526 A1 | 6/2009 | Blake et al. | |
| 2011/0096044 A1 | 4/2011 | Raif et al. | |
| 2011/0242305 A1 | 10/2011 | Peterson et al. | |
| 2012/0105361 A1 | 5/2012 | Kremin et al. | |
| 2012/0171963 A1 | 7/2012 | Tsfaty | |
| 2012/0172689 A1 | 7/2012 | Albert et al. | |

(Continued)

FOREIGN PATENT DOCUMENTS

WO 2008111011 A2 9/2008
WO 2008128989 A1 10/2008

OTHER PUBLICATIONS

Business Wire.Com, "Industry's First Octal Ultrasound Receiver With Digital I/Q Demodulator and Decimation Filter Reduces Processor Overhead in Ultrasound Systems", Jul. 23, 2012, 3 Pages.

(Continued)

*Primary Examiner* — Mark Hellner
(74) *Attorney, Agent, or Firm* — Conley Rose, P.C.; J. Robert Brown, Jr.

(57) ABSTRACT

Embodiments are directed to receiving, by a microphone configured for audio use, an ultrasonic signal, applying an analog-to-digital (A/D) converter to the signal to generate a digital version of the signal, obtaining phase information from the digital version of the signal, and determining a position of an emitter of the ultrasonic signal based on the phase information.

19 Claims, 7 Drawing Sheets

(56) References Cited

U.S. PATENT DOCUMENTS

2013/0021291 A1     1/2013    Kremin et al.
2013/0279717 A1*   10/2013   Reimann et al. ................. 381/93
2014/0225759 A1*    8/2014   Peng et al. .................... 341/143

OTHER PUBLICATIONS

T. Kimura, "A High Resolution Ultrasonic Range Measurement Method Using Double Frequencies and Phase Detection", Ultrasonic Symposium, IEEE Proceedings, Nov. 7-10, 1995, Abstract, 2 Pages.
European Search Report for Application No. 13168226.2, Mailed Oct. 24, 2013, 8 pages.
Horsey, Julian; "Qualcomm's Ultrasonic Pen Sends Paper Written Messages Directly to Your Phone"; http://www.geeky-gadgets.com/qualcomms-ultrasonic-pen-15-02-2011/; Feb. 15, 2011; 10 pages.
Sage, Simon; "Texas Instruments Shows Off Ultrasonic Stylus That Can Work in Three Dimensions"; http://www.androidcentral.com/texas-instrument-shows-ultrasonic-stylus-can-work-three-dimensions; Feb. 29, 2012; 9 pages.
Adams, W.B.; "The Broad-Band-Singal Response of a Phase-Steered Linear Receiving Array"; Proceedings of the IEEE; vol. 52, Issue 1; Jan. 1964; 1 page.
Brooks, Jr., Frederick E.; "A Receiver for Measuring Angle-of-Arrival in a Complex Wave"; Proceedings of the I.R.E.; 1951; 5 pages.
CML Microcircuits; "CMX972, Quadrature Demodulator with IF PLL/VCO (RF Building Block)"; Product Preview; Apr. 1, 2013; 4 pages.

\* cited by examiner

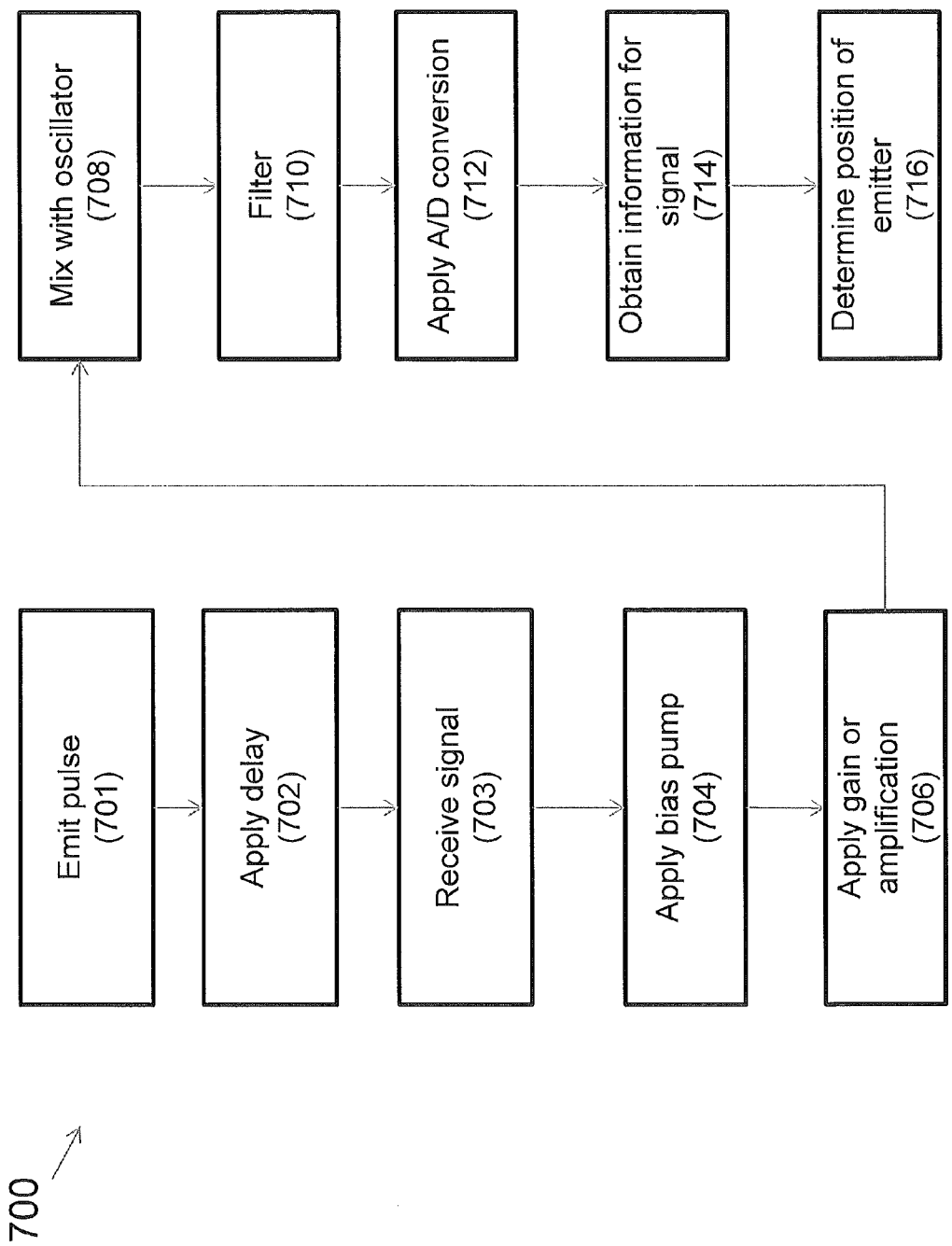

PHASE SENSITIVE LOW POWER DIGITAL ULTRASONIC MICROPHONE

BACKGROUND

Ultrasonic microphones may be used to detect a position of an ultrasound emitting stylus. The microphones used typically utilize the inherent mechanical resonance of small-sized micro-electro-mechanical system (MEMS) structures in order to make a small and inexpensive receiver. The resonance frequency is on the order of 35 to 55 kilohertz (kHz).

The microphones are typically sampled at least twice the largest frequency used (Nyquist criterion) a frequency larger than the resonance frequency. For example, sampling frequencies of 96 kHz or 192 kHz are common, resulting in a relatively large current consumption and low electromagnetic interference (EMI) immunity. An ultrasonic microphone with digital output would similarly suffer from high current consumption due to a large sample rate and a large bandwidth needed to transfer data.

BRIEF DESCRIPTION OF THE DRAWINGS

The present disclosure may be understood, and its numerous objects, features and advantages obtained, when the following detailed description is considered in conjunction with the following drawings, in which:

FIG. 7 illustrates a flow chart of an exemplary method.

DETAILED DESCRIPTION

Figure 1:
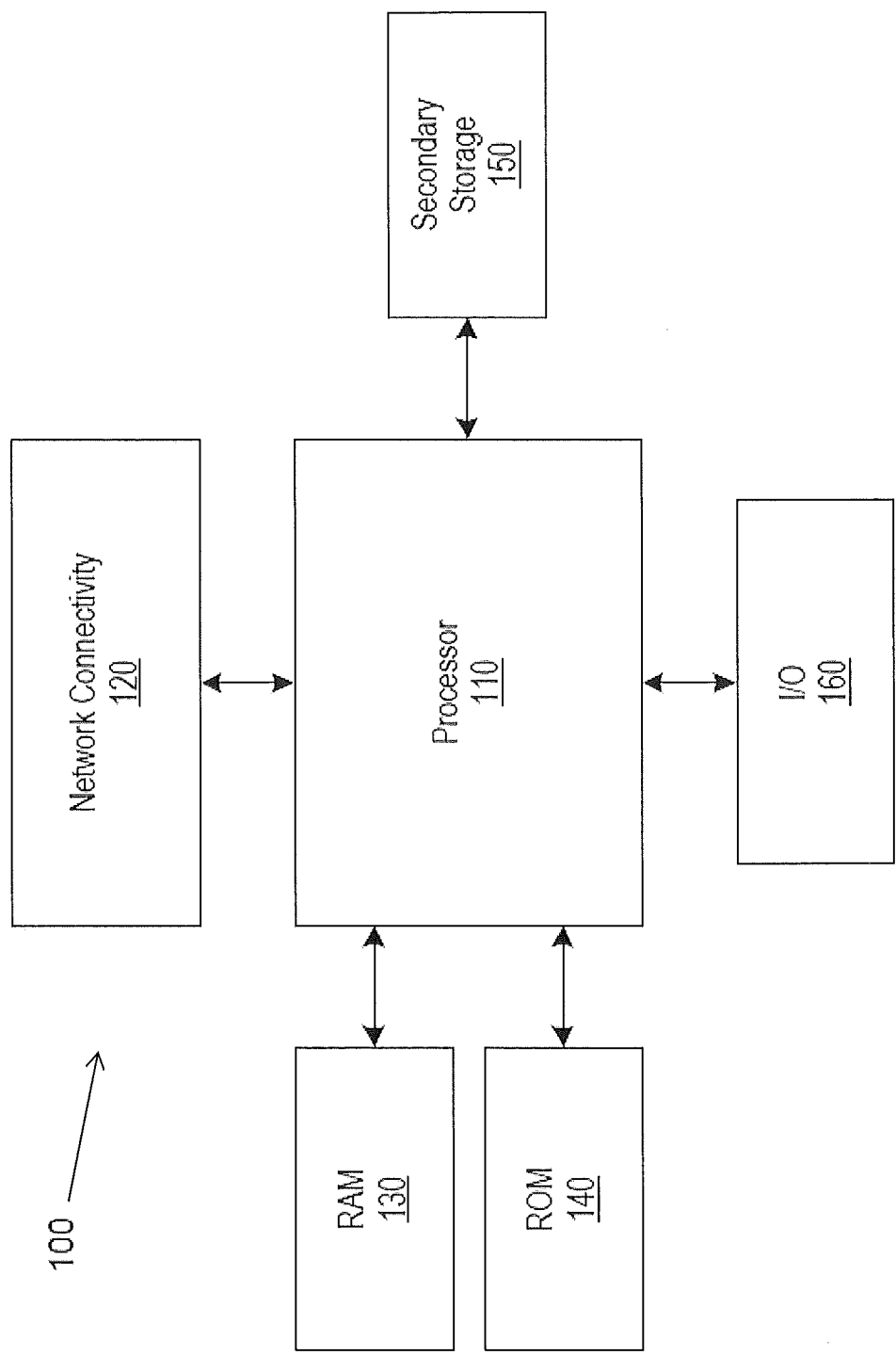
FIG. 1 depicts an exemplary system in which the present disclosure may be implemented.

The present disclosure is directed in general to communications systems and methods for operating the same.

An embodiment is directed to a method comprising: receiving, by a microphone configured for audio use, an ultrasonic signal, applying an analog-to-digital (A/D) converter to the signal to generate a digital version of the signal, obtaining phase information from the digital version of the signal, and determining a position of an emitter of the ultrasonic signal based on the phase information.

An embodiment is directed to an apparatus comprising: a microphone configured for audio use, an amplifier configured to amplify an ultrasonic signal received by the microphone, an analog-to-digital (A/D) converter configured to generate a digital version of the signal, a processor configured to obtain phase information from the digital version of the signal and determine a position of an emitter of the ultrasonic signal based on the phase information.

An embodiment is directed to a system comprising: a first device configured to transmit an ultrasonic signal, and a second device comprising: a microphone configured for audio use and configured to receive the signal, an analog-to-digital (A/D) converter configured to generate a digital version of the signal, and a processor configured to obtain phase information from the digital version of the signal and determine a position of the first device based on the phase information.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable instruction sequence, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers (HLR), visited location registers (VLR), Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), portable computers, tablet computers, and similar devices or other user equipment (UE) that has telecommunications capabilities. Some such devices may be handheld, that is, sized and shaped to be held or carried in a human hand. Such client nodes may likewise refer to a mobile, wireless device (which may or may not be handheld), or alternatively, to devices that have similar capabilities that are not generally or readily transportable or movable from place to place, such as desktop computers, set-top boxes, or sensors. A network node, as used herein, generally includes all nodes with the exception of client nodes, server nodes and access nodes. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc.) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. The actual dimensions of the cell may depend on the radio frequency of operation, the radio propagation conditions and the density of communications traffic. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infra-red signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives, solid state drives, or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, track pads, voice recognizers, card readers, paper tape readers, printers, video monitors, or other well-known input/output devices.

Figure 2:
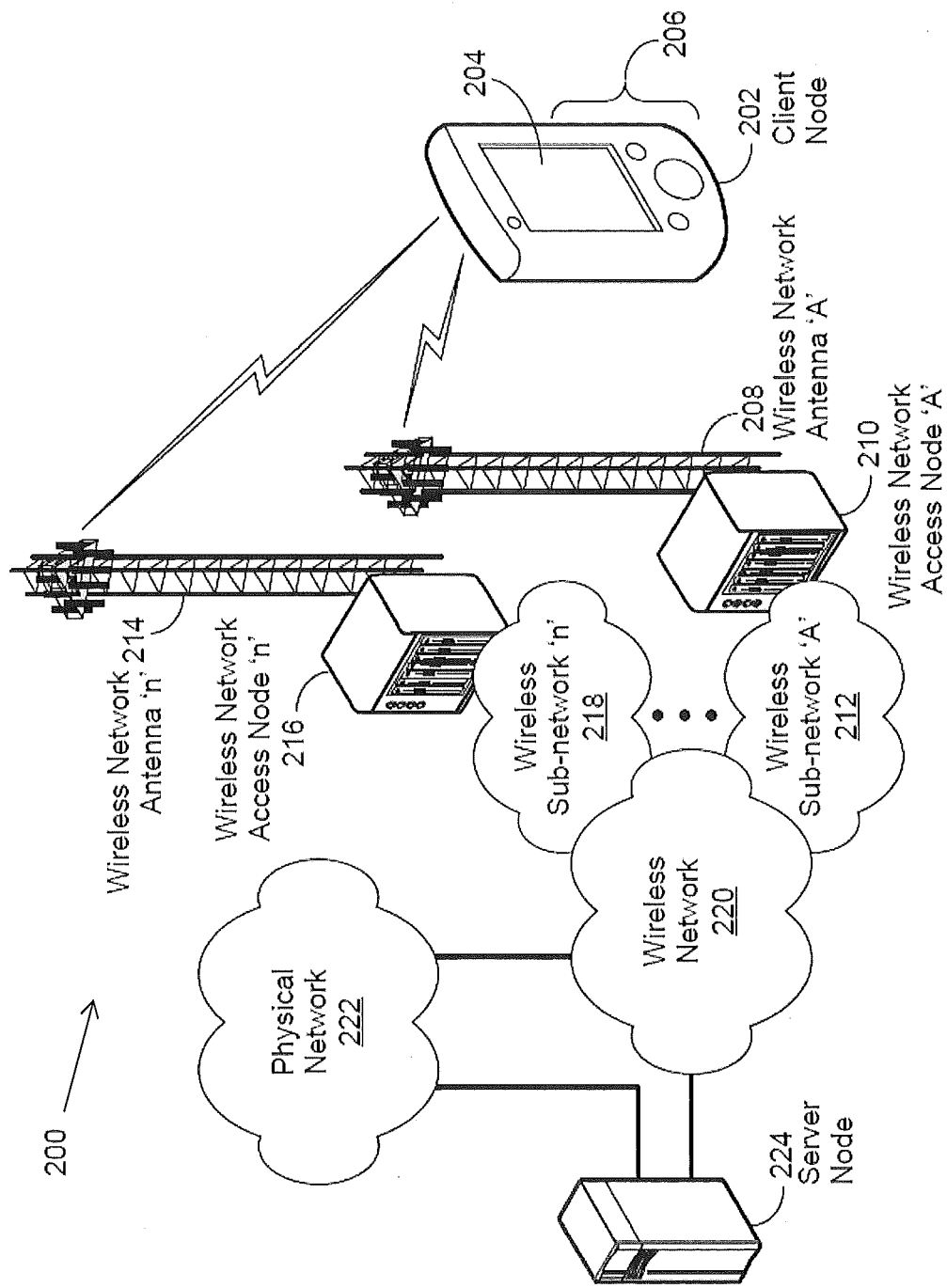
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, DVORAK, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be moved to different positions, e.g., inwardly depressed, to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a core network 222, e.g., a global computer network such as the Internet. Via the wireless network 220 and the core network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless sub-network 212. Skilled practitioners of the art will recognize that many such embodiments are possible and the foregoing is not intended to limit the spirit, scope, or intention of the disclosure.

Figure 3:
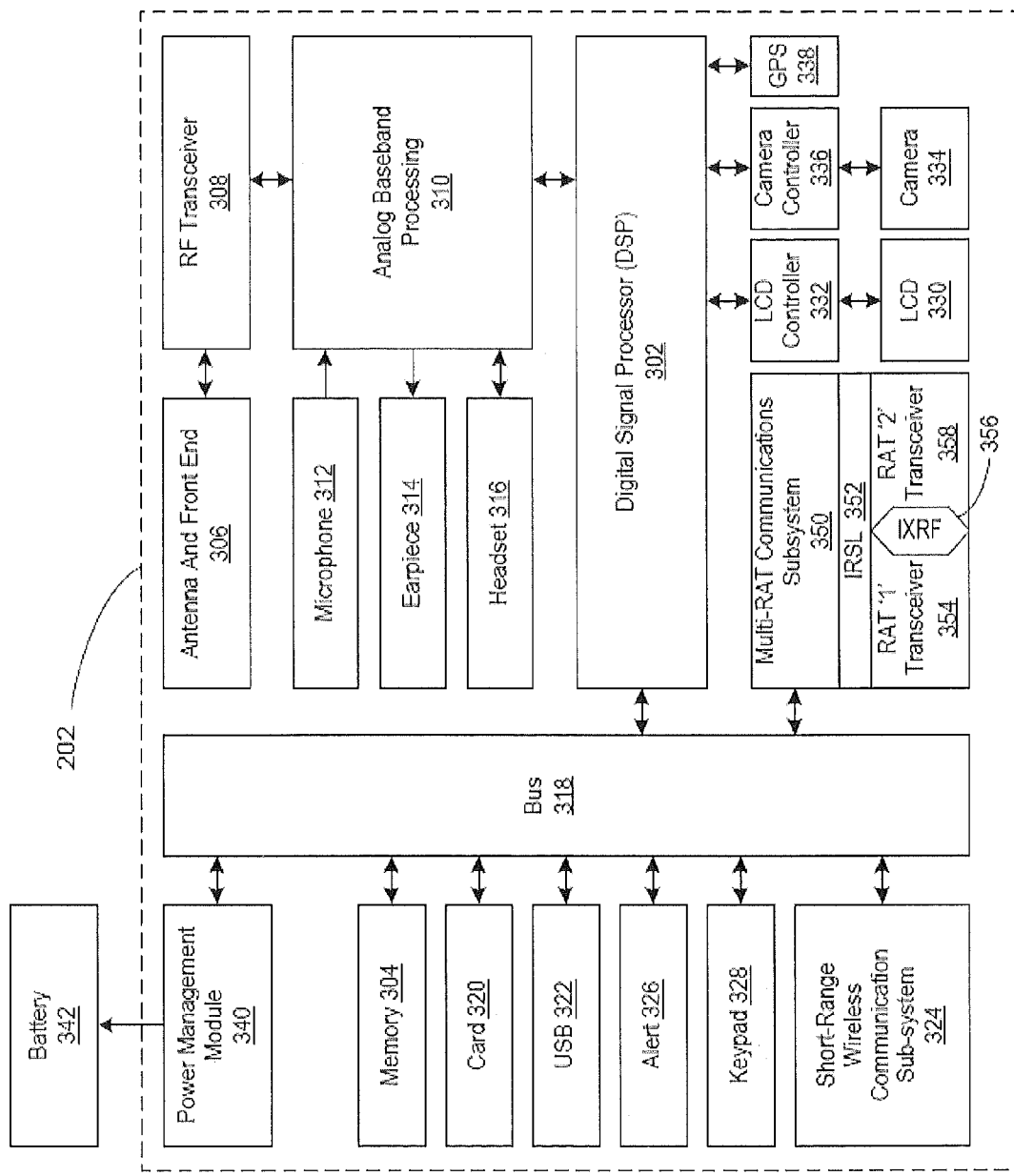
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface ("Bus") 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

Note that in this diagram the radio access technology (RAT) RAT1 and RAT2 transceivers 354, 358, the IXRF 356, the IRSL 352 and Multi-RAT subsystem 350 are operably coupled to the RF transceiver 308 and analog baseband processing unit 310 and then also coupled to the antenna and front end 306 via the RF transceiver 308. As there may be multiple RAT transceivers, there will typically be multiple antennas or front ends 306 or RF transceivers 308, one for each RAT or band of operation.

The analog baseband processing unit 310 may provide various analog processing of inputs and outputs for the RF transceivers 308 and the speech interfaces (312, 314, 316). For example, the analog baseband processing unit 310 receives inputs from the microphone 312 and the headset 316 and provides outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes. The short-range wireless communication Sub-system 324 may also include suitable RF Transceiver, Antenna and Front End subsystems.

The input/output interface ("Bus") 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface ("Bus") 318 to provide one mechanism for the user to make selections, enter information, and otherwise provide input to the client node 202. The keyboard 328 may be a full or reduced alphanumeric keyboard such as QWERTY, DVORAK, AZERTY and sequential types, or a traditional numeric keypad with alphabet letters associated with a telephone keypad. The input keys may likewise include a trackwheel, track pad, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to make digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. The GPS sensor 338 may be coupled to an antenna and front end (not shown) suitable for its band of operation. Various other peripherals may also be included to provide additional functions, such as radio and television reception.

In various embodiments, the client node (e.g., 202) comprises a first Radio Access Technology (RAT) transceiver 354 and a second RAT transceiver 358. As shown in FIG. 3, and described in greater detail herein, the RAT transceivers '1' 354 and '2' 358 are in turn coupled to a multi-RAT communications subsystem 350 by an Inter-RAT Supervisory Layer Module 352. In turn, the multi-RAT communications subsystem 350 is operably coupled to the Bus 318. Optionally, the respective radio protocol layers of the first Radio Access Technology (RAT) transceiver 354 and the second RAT transceiver 358 are operably coupled to one another through an Inter-RAT eXchange Function (IRXF) Module 356.

In various embodiments, the network node (e.g. 224) acting as a server comprises a first communication link corresponding to data to/from the first RAT and a second communication link corresponding to data to/from the second RAT.

Embodiments of the disclosure are directed to one or more systems, apparatuses, devices, and methods for reducing or minimizing a sampling bandwidth associated with a microphone, such as an ultrasonic microphone. The lower bandwidth may result in a lower sampling frequency, which may in turn reduce power consumption associated with transferring an ultrasonic signal and may enhance immunity to noise (e.g., electrical noise). Although reduced power consumption may be a potential or expected technical benefit, no particular amount of reduced power consumption is strictly necessary to implementation of the concept.

Embodiments of the disclosure may be based on a bandwidth of data/information that is obtained from a microphone being smaller than the resonance frequency of the microphone, which as described above is typically on the order of 35-55 kHz. In some embodiments, phase detection may be used to provide accurate distance or position estimates for an ultrasound emitting stylus. In embodiments where multiple frequencies are used, distances longer than a single wavelength may be resolved without any phase ambiguity.

In some embodiments, the required bandwidth of the received signal may depend on the update rate of the stylus. Typical update rates from touch-based solutions are in the range of 30-60 samples or frames per second. Aiming for greater performance from the stylus, e.g., on the order of 300-1000 samples or frames per second, is realistic. It should be noted that this sample rate of 300-1000 samples per second is significantly less than the 96-192 kHz sample rate that is used in conventional systems and designs to capture the ultrasound signals. The number of required samples is determined by the delay due to the speed of sound and the distance between the ultrasonic source and the receiver. By transmitting the distance information in a different way than directly providing an electrical representation of the received ultrasonic signals, a lower sampling frequency may be used and the power consumption associated with transferring the signal/data/information may be reduced significantly.

Figure 4:
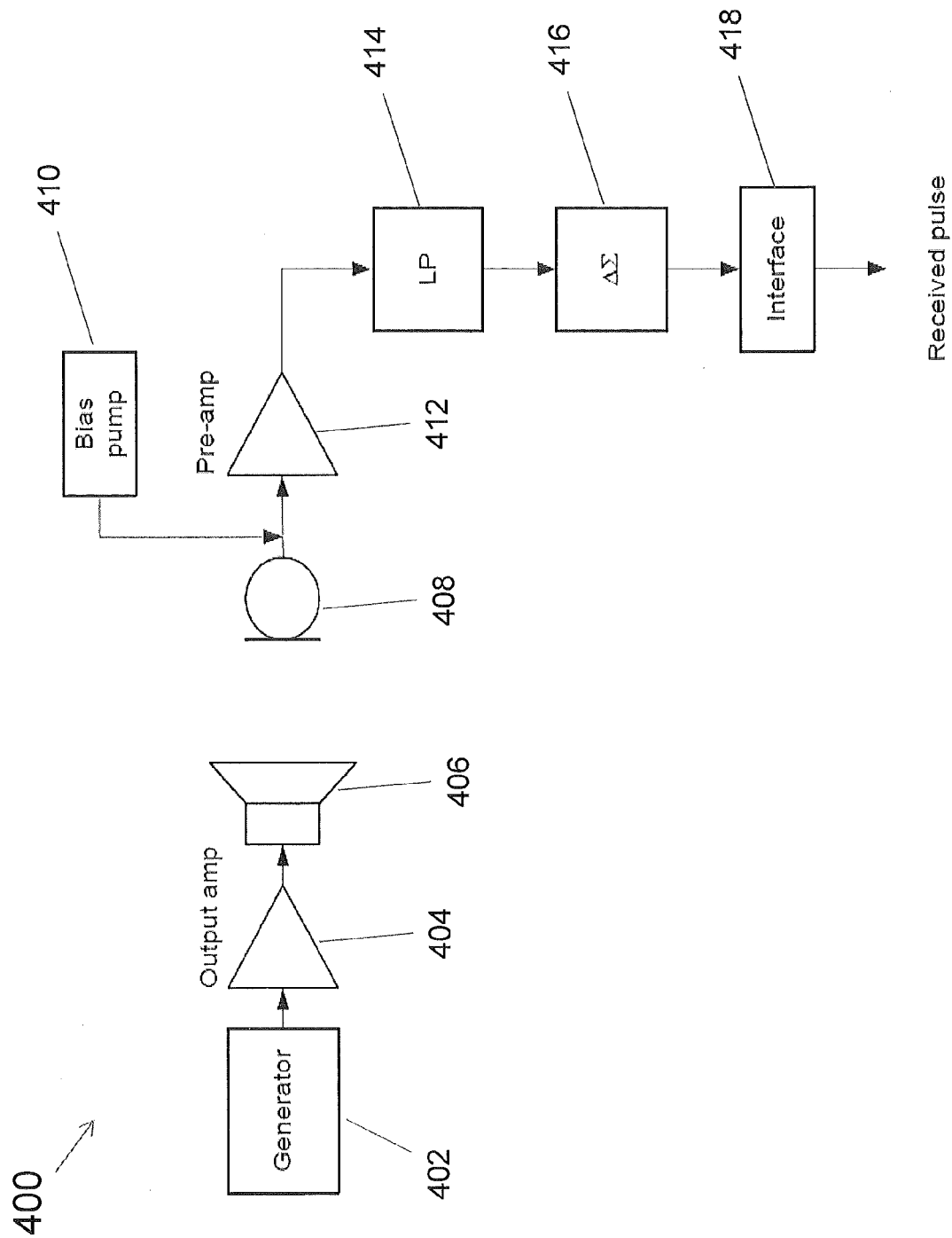
FIG. 4 illustrates a block diagram of an ultrasonic transmitter and receiver.

Turning now to FIG. 4, a block diagram 400 in accordance with one or more embodiments is shown. As shown in FIG. 4, a generator 402 may be responsible for generating a signal, such as an ultrasonic signal. The signal may undergo one or more transformations of form, such as from a time-varying or other electrical signal to sound waves and back into an electrical signal. Further, the signal may undergo processing, such as amplification, filtering, and conversion to or from a digital form. The signal may, but need not, retain substantially all of its original information as it undergoes transformation and processing. The signal, which may be generated by the generator 402 in the form of a time-varying electrical signal, may correspond to one or more pulses, where a first pulse may differ from a second pulse in terms of tone or frequency. In some embodiments, different pulses may be used to guard against false readings in the case of measurement noise. The frequencies for the used pulses may be different, resulting in a different received phase difference of between the signals emitted by the transmitter and received by the receiver.

The signal generated by the generator 402 may be passed through an amplifier 404 and the amplified signal may be transmitted via a transmitter 406. The transmitter 406 may be implemented as a speaker (e.g., a MEMS speaker) or a piezoelectric crystal. The transmitter 406 may convert the signal—which may be an electrical signal—to another form, such as an ultrasonic signal in the form of ultrasonic sound waves, and transmit or emit the sound waves.

In some embodiments, one or more of the devices 402-406 may be included in a stylus. The concepts described herein can be implemented in some embodiments with hardware that adds no or negligible size or mass to a stylus.

The transmitted (or emitted) signal, in the form of sound waves, may be received by a microphone 408. The microphone 408 may be a standard microphone that may be used for audio purposes, which may include receiving sound waves and converting the sound waves to another form, such as a time-varying electric signal. The microphone 408 may be described as being configured for audio use. In general, a component that is "configured to" perform a function is suitable for performing the function, or is adapted to perform the function, or is operable to perform the function, or is otherwise capable of performing the function. Receiving the signal may include receiving the signal in the form of ultrasonic sound waves and generating an electrical signal as a function of the received ultrasonic sound waves. In some embodiments, the microphone 408 may be an electret microphone or a MEMS microphone.

A bias pump 410 may be used to pre-charge the membrane of a MEMS-based microphone. (In this context, pre-charging refers to charging at any time prior to receiving some of the sound waves.) The bias pump 410 may generate a voltage around, e.g., 10 Volts. The bias pump 410 may be used to improve the signal-to-noise-ratio (SNR) for the received signal of a MEMS microphone. If an electrets microphone is used, no bias generator is needed since the electret by itself will supply the biasing internally The received signal may be amplified using an amplifier 412. The amplifier 412 may include a low noise P-type metal-oxide-semiconductor (PMOS) biased in weak inversion or a JFET transistor in order to provide a high impedance input buffer so that the membrane signal is not loaded excessively.

The output of the amplifier 412 may be passed through a filter, such as low-pass (LP) filter 414. The output of the filter 414 may be passed through an analog-to-digital (A/D) converter, such as based on a delta-sigma modulator 416. Additional processing may be performed to condition the received signal/pulse for one or more interfaces 418. For example, the output of the converter 416 may be transferred digitally using a low bandwidth digital interface 418 to a codec or directly to a processor.

Figure 5:
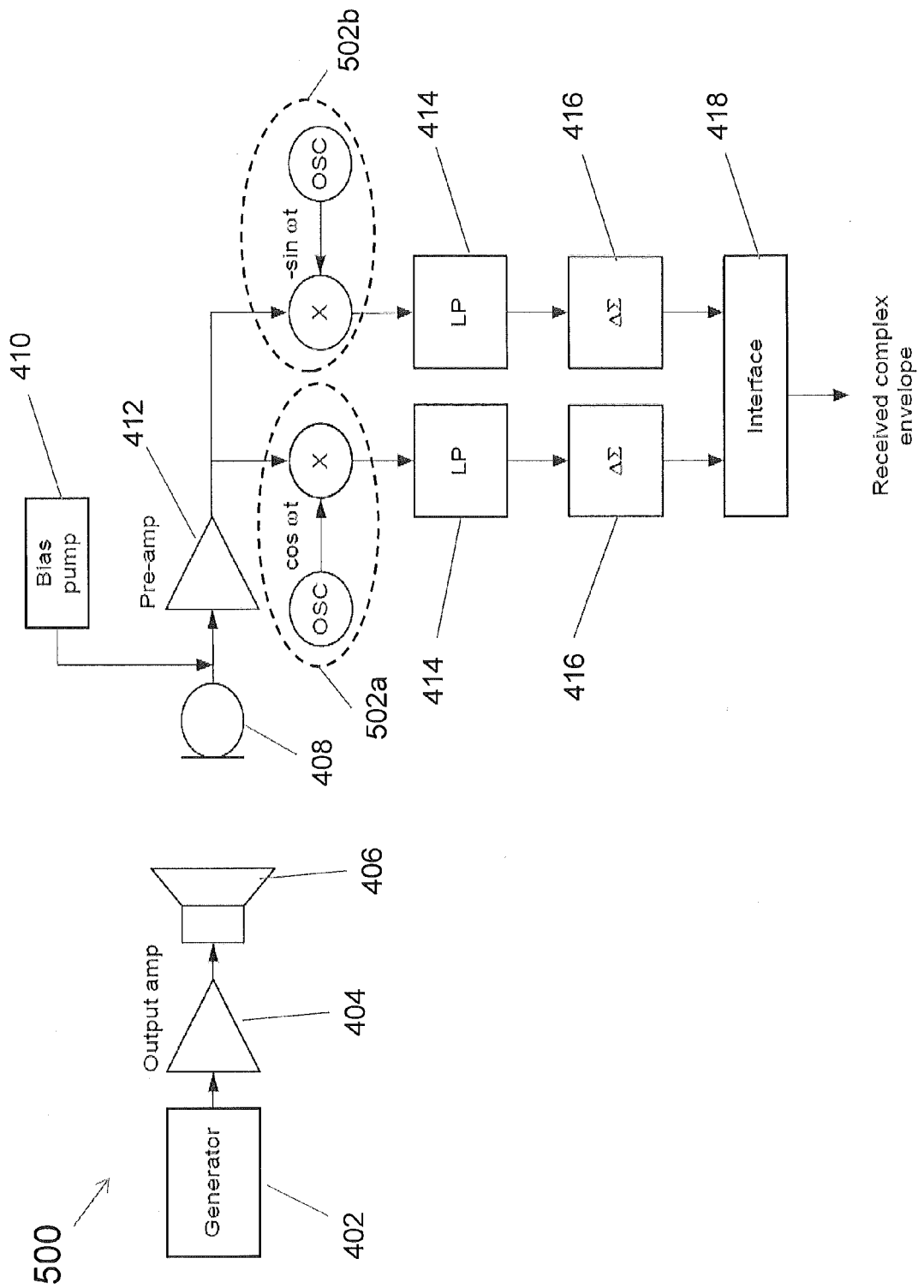
FIG. 5 illustrates a block diagram of an ultrasonic transmitter and receiver based on sampling of in-phase and quadrature components.

Referring now to FIG. 5, a block diagram 500 in accordance with one or more embodiments is shown. The block diagram 500 is similar to the block diagram 400, and so a complete re-description is omitted herein for the sake of brevity.

The block diagram 500 is shown as including devices 502a and 502b. The devices 502a and 502b may include an oscillator (OSC). The devices 502a and 502b may be used to obtain phase information from the digital version of the signal, including the in-phase (i.e. multiplied by cos ωt, 502a) and quadrature (i.e. multiplied by −sin ωt, 502b) components of the received signal (as provided by the amplifier 412). Accordingly, a received complex envelope may be output by the interface 418, and the filter 414 and converter 416 of FIG. 4 may be replicated for the in-phase and quadrature components as shown in FIG. 5.

Figure 6:
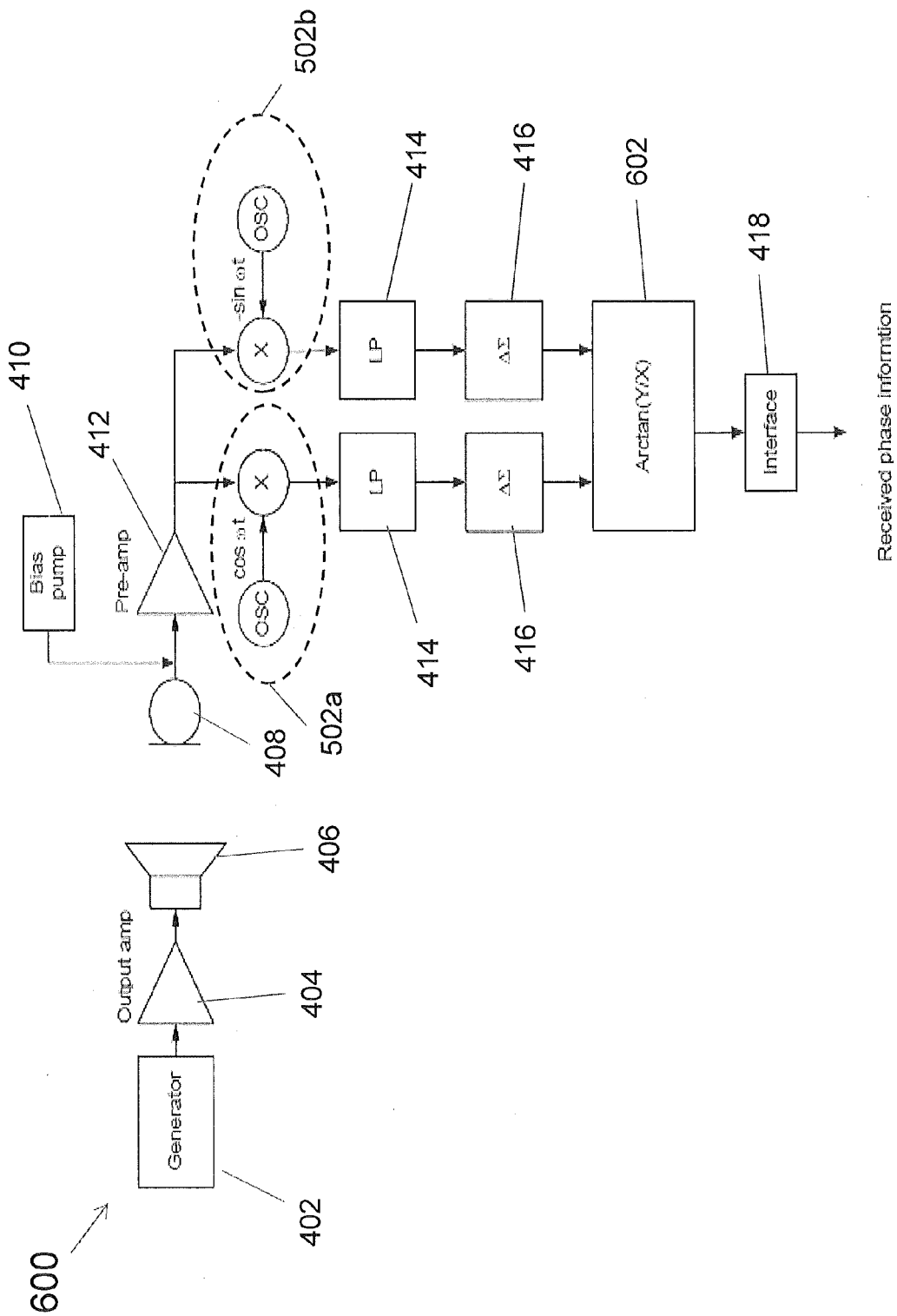
FIG. 6 illustrates a block diagram of an ultrasonic transmitter and receiver for recovering phase information.

Referring now to FIG. 6, a block diagram 600 in accordance with one or more embodiments is shown. The block diagram 600 is similar to the block diagram 500, and so a complete re-description is omitted herein for the sake of brevity.

The block diagram 600 is shown as including a device 602. The device 602, which may include one or more circuits, may implement an inverse tangent algorithm. For example, phase information associated with the received signal may be converted from a rectangular format (i.e. the demodulated sinusoids) into a polar format using the device 602.

The block diagrams 400-600 are illustrative. In some embodiments, one or more of the components/devices may be optional. In some embodiments, additional devices/components not shown may be included. In some embodiments, the components/devices may be organized or arranged in a manner that is different from what is shown. For example, in some embodiments the coupling between components/devices may be different from what is shown. In some embodiments, one or more of the components/devices may be combined or included in another of the components/devices (e.g., one or more of the components/devices may be included in the microphone 408).

In some embodiments, a received ultrasonic signal may be converted from the time domain and into the phase domain via complex demodulation of the received ultrasonic signal and subsequent rectangular to polar format conversion. This conversion can be performed before or after digitization. In some embodiments, complex demodulation may be performed in the analog domain, before digitization, and the in-phase and quadrature components may be sampled using, e.g., a pair of delta-sigma converters (e.g., converters 416). The signals may be converted from the complex domain into the phase domain using the arc tangent function (implemented as an algorithm in software or directly in hardware) followed by filtering. A transfer of digital data between an ultrasonic transducer (e.g., the receiver components/devices associated with the block diagrams 400-600) and a codec or processor may be implemented.

When measuring the phase difference between the emitter (or transmitter) and the receiver, there will exist a phase ambiguity as soon as the distance between these two components is larger than one wavelength. Thus, using single measurement frequency the distance over which accuracy position information can be obtained is very limited. By obtaining two or more phase readings from a sensor (such as a microphone), this phase ambiguity may be resolved and an accurate measurement can be made over much larger distances. By obtaining distance information from two or more receiving sensors, an accurate determination of the position of the transmitter (e.g. implemented inside a stylus) may be made in two or more dimensions. Generally speaking, determining the position of the emitter (or transmitter) entails determining the location of the emitter with respect to any reference point or reference points. A reference point may be, for example, a site on the apparatus, such as a microphone or a location on a touch screen. Thus, if three-dimensional information is to be obtained, at least three receiving sensors should be used and the phase information from these sensors should be combined in order to find the resulting (x, y, z) position of the transmitter. The position may be equivalently expressed in other coordinate systems.

In some embodiments, the complex demodulation may be performed inside a codec connected to an ultrasonic microphone. Performing the demodulation inside the codec before sampling the signal, as opposed to inside a microphone (e.g., microphone 408), may minimize the cost of the microphone. This technique may be viewed as an intermediate solution between sampling a received ultrasonic signal at a very high rate (e.g., 96-192 kHz) and performing the entire sampling inside the microphone. In this case, the bandwidth required to transfer the signal between the microphone and the codec is not reduced (but this would be in the analog domain and therefore limited power would be spend) but the sampling frequency of the converter inside the codec can be greatly reduced, thereby saving power.

Referring to FIG. 7, a flow chart of an exemplary method 700 is shown. The method 700 may be used to reduce the power consumption associated with demodulating a received signal, such as a received ultrasonic signal. The method 700 may be executed in connection with one or more components or devices, such as those described herein.

In block 701a pulse is emitted from a generator.

In block 702 a delay is applied to account for the finite delay between transmission and reception of the signal.

In block 703, a signal may be received. The signal (in the form of sound waves) may be composed of one or more pulses of varying tones or frequencies. The signal may be received by a microphone. The microphone transduces the received sound wave signal to another form, such as an electrical signal. The electrical signal may be subjected to further processing.

In block 704, a bias pump may be applied to the signal. A bias pump may be applied if, for example, the signal is received using a MEMS microphone.

In block 706, the signal may be subjected to gain or amplification.

In block 708, the signal may be subjected to multiplication or mixing with an oscillator, potentially as part of a demodulation algorithm. As part of block 708, the in-phase and quadrature components of the signal may be obtained.

In block 710, the signal may be filtered (e.g., low-pass filtered). The filtering may be performed to eliminate frequency components that may be associated with noise or frequency components generated as part of block 708. The combination of block 708 and block 710 reduces the bandwidth of the measured signals substantially while retaining all measurement information. This also reduces the influence of noise due to the narrower bandwidth of the output signals.

In block 712, the signal may be subjected to analog-to-digital (A/D) conversion. For example, the signal may be subjected to conversion using a delta-sigma modulator. This may also be described as applying the analog-to-digital (A/D) converter to the signal, to generate a digital version of the signal.

In block 714, angle or phase information for the signal may be obtained. As part of block 714, an arc tangent algorithm may be applied and these values be transmitted as digital outputs. Alternatively, the output samples from the A/D converter(s) may be transmitted instead and the conversion is performed elsewhere in the system. In some embodiments, the information of block 714 may include information pertaining to the amplitude of the signal.

In block 716, a position of an emitter (e.g., a stylus) may be determined. The determination may be based on the information of block 714.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments of the disclosure may be implemented using one or more technologies. In some embodiments, an apparatus or system may include one or more processors, and memory storing instructions that, when executed by the one or more processors, cause the apparatus or system to perform one or more methodological acts, such as those described herein. Various mechanical components known to those of skill in the art may be used in some embodiments.

Embodiments of the disclosure may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts, such as those described herein. In some embodiments, the functionality described herein may be implemented in hardware, software, firmware, or any combination thereof.

The particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A method comprising:
    receiving, by a microphone configured for audio use, an ultrasonic signal;
    applying an analog-to-digital (A/D) converter to the signal to generate a digital version of the signal;
    obtaining phase information from the digital version of the ultrasonic signal, wherein the phase information comprises an in-phase component and a quadrature component of the ultrasonic signal; and
    determining a position of an emitter of the ultrasonic signal based on the phase information.

2. The method of claim 1, wherein the microphone comprises a micro-electro-mechanical system (MEMS) microphone.

3. The method of claim 1, wherein the microphone comprises an electric microphone.

4. The method of claim 1, wherein the A/D converter comprises a delta-sigma converter.

5. The method of claim 1, further comprising:
    applying a bias pump to pre-charge a membrane of the microphone;
    amplifying the received ultrasonic signal subjected to the bias pump;
    obtaining the in-phase and the quadrature components of the amplified ultrasonic signal by mixing the amplified signal with at least one oscillator; and
    filtering the in-phase and quadrature components,
    wherein the A/D converter is applied to the filtered in-phase and quadrature components.

6. The method of claim 1, further comprising:
    obtaining the phase information by applying an arc tangent algorithm.

7. An apparatus comprising:
    a microphone configured for audio use;
    an amplifier configured to amplify an ultrasonic signal received by the microphone;
    an analog-to-digital (A/D) converter configured to generate a digital version of the signal; and
    a processor configured to obtain phase information from the digital version of the ultrasonic signal and determine a position of an emitter of the ultrasonic signal based on the phase information, wherein the phase information comprises an in-phase component and a quadrature component of the ultrasonic signal.

8. The apparatus of claim 7, wherein the processor is configured to obtain amplitude information from the digital version of the signal and determine the position of the emitter based on the amplitude information.

9. The apparatus of claim 7, wherein the microphone comprises a micro-electro-mechanical system (MEMS) microphone, the apparatus further comprising:
    a bias pump coupled to the microphone and the amplifier, wherein the bias pump is configured to pre-charge a membrane of the MEMS microphone.

10. The apparatus of claim 7, further comprising:
    at least one oscillator coupled to the amplifier; and
    at least one low pass filter coupled to the at least one oscillator and at least one A/D converter,
    wherein the at least one A/D converter comprises the A/D converter.

11. The apparatus of claim 7, wherein the A/D converter comprises a delta-sigma converter.

12. The apparatus of claim 7, wherein the processor is configured to obtain the phase information by applying an arc tangent algorithm.

13. A system comprising:
    a first device configured to transmit an ultrasonic signal; and
    a second device comprising:
        a microphone configured for audio use and configured to receive the signal,
        an analog-to-digital (A/D) converter configured to generate a digital version of the signal, and
        a processor configured to obtain phase information from the digital version of the ultrasonic signal and determine a position of the first device based on the phase information, wherein the phase information comprises an in-phase component and a quadrature component of the ultrasonic signal.

14. The system of claim 13, wherein the first device comprises:
    a tone generator configured to generate a plurality of pulses comprising a plurality of frequencies, and
    a transmitter configured to transmit the plurality of pulses as the signal.

15. The system of claim 14, wherein the transmitter comprises at least one of a piezoelectric crystal and a micro-electro-mechanical system (MEMS) speaker.

16. The system of claim 14, wherein the first device comprises:
an amplifier configured to amplify the pulses.

17. The system of claim 13, wherein the second device comprises:
an amplifier configured to amplify the received signal,
at least one oscillator coupled to the amplifier, and
at least one low pass filter coupled to the at least one oscillator and at least one A/D converter,
wherein the at least one A/D converter comprises the A/D converter.

18. The system of claim 17, wherein the amplifier, the at least one oscillator, the at least one low pass filter, and the at least one A/D converter are included in the microphone.

19. The system of claim 13, wherein the microphone is associated with a touch screen.

* * * * *